United States Patent [19]

Minix, deceased et al.

[11] 4,108,346
[45] Aug. 22, 1978

[54] ALIGNMENT CLAMP

[76] Inventors: James Warren Minix, deceased, late of Houston, Tex.; by Richard W. Minix, administrator, 6710 Biggs, Houston, Tex. 77017; by Helen Minix, administratrix, 14214 Lantern La., Houston, Tex. 77015

[21] Appl. No.: 666,798

[22] Filed: Mar. 15, 1976

[51] Int. Cl.² .......................................... B23K 37/04
[52] U.S. Cl. ....................................... 228/49; 29/272; 29/281.1; 29/281.5; 269/49; 269/234; 228/44.5
[58] Field of Search ........................ 228/57, 49, 44.1 R, 228/44.5; 29/200 P, 271, 272, 281.1, 281.5; 269/37, 47, 49, 234; 254/104

[56] References Cited

U.S. PATENT DOCUMENTS

| | | | |
|---|---|---|---|
| 1,309,067 | 7/1919 | Heltzel | 269/234 X |
| 1,552,912 | 9/1925 | Colt | 254/104 |
| 2,395,656 | 2/1946 | Chatfield | 269/49 |
| 2,672,839 | 3/1954 | Neuhaus | 269/49 UX |
| 3,342,479 | 9/1967 | Howe | 269/49 X |
| 3,512,325 | 5/1970 | Nichols | 254/104 X |

Primary Examiner—Al Lawrence Smith
Assistant Examiner—K. J. Ramsey
Attorney, Agent, or Firm—Donald Gunn

[57] ABSTRACT

An alignment clamp is disclosed for uses such as welding adjacent plates. The clamp utilizes a strap which passes through a gap between the adjacent plates. The strap is attached at one end by a plate like clamp member which is to be located on one side of the welded plates. The strap connects to a clamp member on the opposite side. The second clamp member is located above the plate to be clamped. It is on freely movable guide posts spaced apart from a bearing plate. A tapered wedge is driven between the second clamp member and the bearing plate. The tapered wedge separates the two and pulls the strap taut. When it is taut, it levels and temporarily connects the adjacent plates held by the clamp to permit welding in the gap between the adjacent plates, and is thereafter disassembled to enable the removal of the clamp to close the gap by welding.

6 Claims, 5 Drawing Figures

ALIGNMENT CLAMP

BACKGROUND OF THE INVENTION

The present disclosure is an alignment clamp for plates to be welded. In the welding of plates such as the formation of a pressure vessel, it is necessary to join adjacent plates, either planar or curved as required by welding. The plates must be carefully aligned before the welding process can begin. Good craftsmanship dictates that the alignment be almost perfect to measurably reduce problems in welding. Welding is a difficult enough art, what with problems resulting from spot heating, expansion, shrinkage on cooling, and the requirements for a perfect weld as in the case of a pressure vessel. Thus, the apparatus of the present invention is very needed.

Devices known in the prior art have attempted with some degree of sucess to align plates to be welded. They are however, rather clumsy and cumbersome to use. It is difficult to align two plates which may themselves weigh several thousand pounds through the use of an alignment device which also is large, cumbersome, and difficult for a welder to install. The present invention is a device which is relatively small so that the fitter does not have to strain mightily to position two plates and a very large alignment tool before welding begins. With this in view, the disclosed apparatus is an alignment tool which is quite small and which can be installed in multiples to align plates prior to welding. In the example of welding adjacent sections of tank sections 4 feet in diameter, a minimum of three of the alignment tools of the present invention is preferably used and as many as six or eight can be used should there be dents or distortion from a perfect circular shape of the plate to be welded. They can be installed rather quickly. The alignment tool of the present invention is easily installed at multiple locations around the plates to be welded after which the welding process can begin whereby a bead is formed between the plates and they are joined. Gaps are left in the welded bead where the alignment tool contacts the plate and which is subsequently removed. Thereafter, the gaps can be welded.

SUMMARY OF THE INVENTION

This invention is an alignment tool for positioning plates or pipe prior to welding. It utilizes two thin strap passing between plates to be welded. To align plates for welding they are normally spaced apart from one another with a small gap where the straps passes. On one end of the strap, a clamp plate is located and it is constructed and arranged to bear against the less convenient side of the two plates. On the more convenient side, the strap is exposed and secured by a second clamping member. This clamping member encorporates three major components. Adjacent to the plates, the first component is a bearing plate. It is positioned against the two plates and forces them to a common plane. The upper most member is a clamp member which is secured to the strap and which is moveable vertically or along the major dimension of the strap. Between the two, a tapered wedge is inserted. The tapered wedge can be struck with a hammer to wedge the bearing plate more firmly against the plates to be aligned. When this occurs, allignment is complete.

DESCRIPTION OF THE PREFERRED EMBODIMENTS

Figure 1:
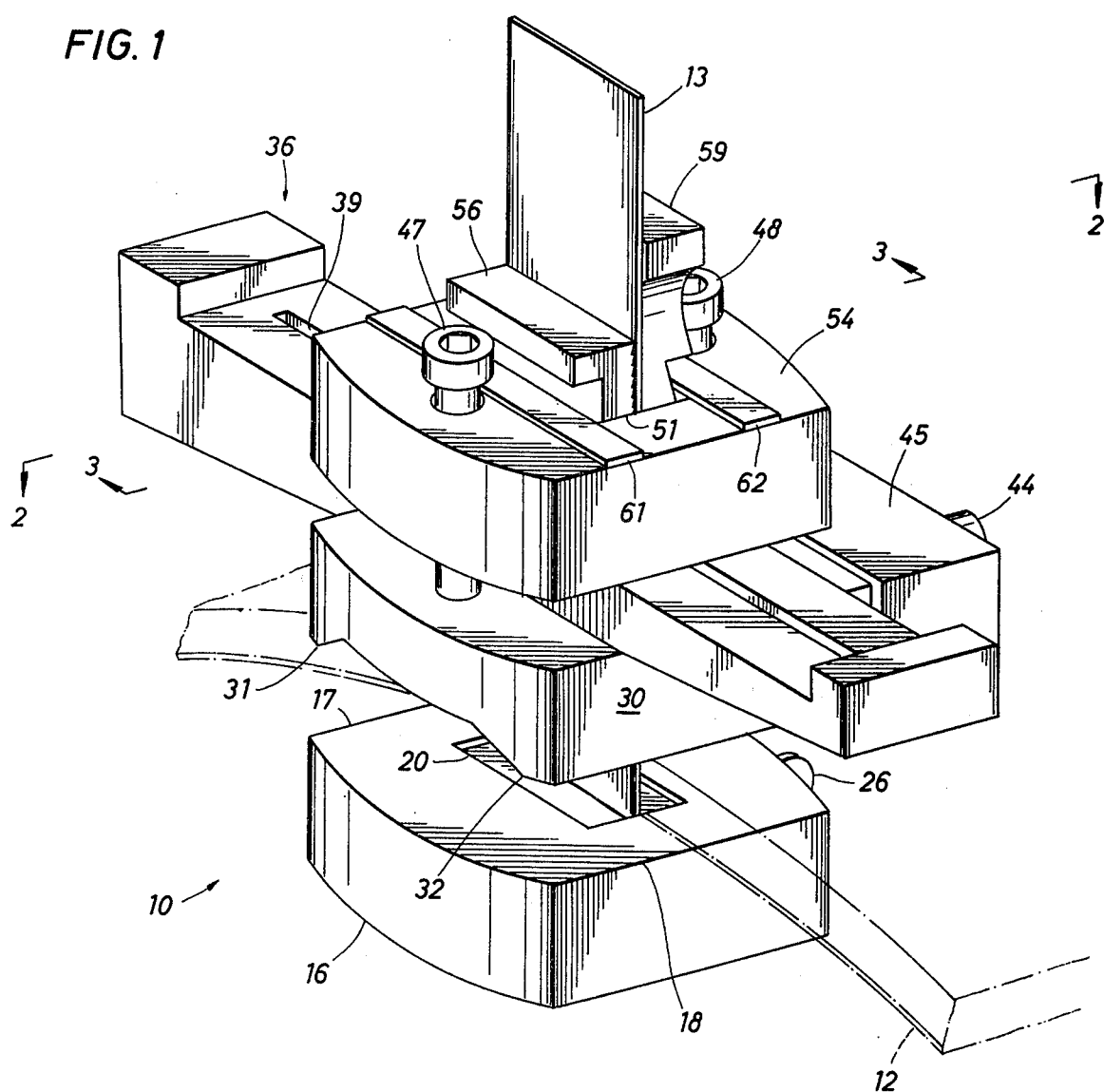
FIG. 1 is a perspective view of the alignment tool of the present invention adjacent to a plate to be aligned and showing how it bears on the top and lower faces thereof.

The alignment clamp 10 shown in FIG. 1 is suitably used for alignment of two plates. Two plates are shown on dotted line in FIG. 3 and will be identified as the first plate 11 and the second plate 12. They are typically of common stock and are curved to a common radius. The tool 10 is useable with flat stock also. The first and second plates typically are bevelled at the edges that abut one another. They are shown slightly spaced apart by a distance determined by a strap 13. The strap 13 passes through them and defines the minimum gap between the two. Such a gap is ordinarily necessary in welding adjacent plates. The plates might be, for instance, ⅛ to 2 inches in thickness although these dimensions are merely representative. The plates 11 and 12 are typically formed of various metals to be joined as in the formation of a pressure vessel or the like.

Figure 3:
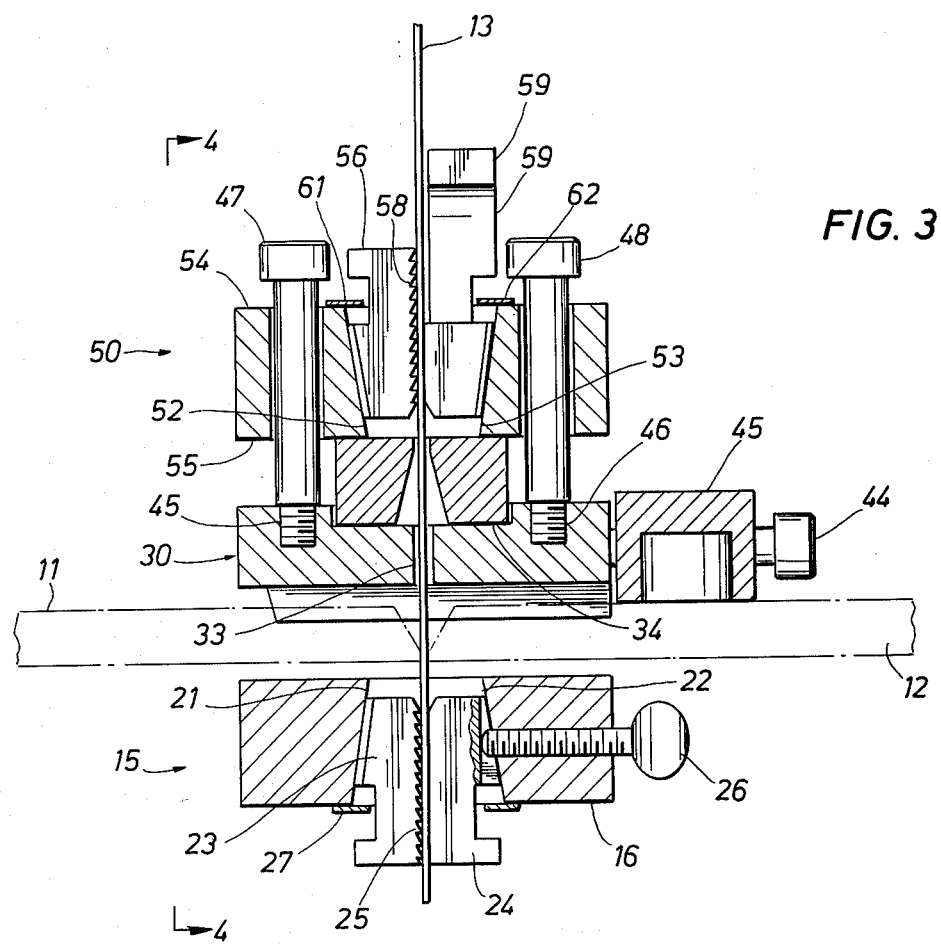
FIG. 3 is a sectional view along the line 33 of FIG. 2 showing the tool positioned against a pair of plates which are now aligned.

In FIG. 3 of the drawings, a lower clamp member 15 is illustrated. The lower clamp member 15 has a generally rectangular body 16. The body 16 has a pair of edges 17 and 18 (see FIG. 1) which are adapted to touch both the first and second plates on the nether side. They are the only edges that touch in the event that the plates are curved although the entire face between the edges 17 and 18 may touch if flat stock is being aligned. The lower clamp member 15 thus begins with a generally rectangular plate and it incorporates a rectangular opening 20 in it. The opening 20 is wide enough to receive the trap 13 through it. At two of the four faces of the rectangular opening, the sides are angled with respect to one another as better shown in FIG. 3 of the drawings. The faces 21 and 22 taper toward one another. This enables the tapered faces to receive wedge shaped grippers 23 and 24. The gripers 23 and 24 are identical in shape. They are tapered on the outer faces to slide into the rectangular hole 20. The gripper 23 is provided with serrations 25 on its face in contact with the strap 13. The gripper 24 is provided with a flat or smooth face to contact the straps. It works opposite the cirrated face 25 and the two together clamp the strap 13. The gripper 23 is tapered across the width of its face in contact with the tapered face 21. The gripper 24 is tapered across the width of its exposed face except that a vertical slot is cut therein and the slot terminates in a vertical side parallel to the opposite vertical side. This enables a set screw 26 to be threaded through the block 15. The set screw is threaded into the body or block 15. It extends into the rectangular opening 20 and clamps the two grippers together thereby pinching the strap 13 between the two and holding it fast. The tapered grippers are held in the rectangular opening 20 and maintained therein by a shoulder 27 which encircles the bottom opening of the rectangular hole 20.

As assembled, the bottom clamp mechanism 15 holds the strap 13 when tension is placed on the strap away from the bottom clamp. As the tension increases, the grippers take a firmer grip on the strap 13 thereby holding it against any slippage.

Figure 4:
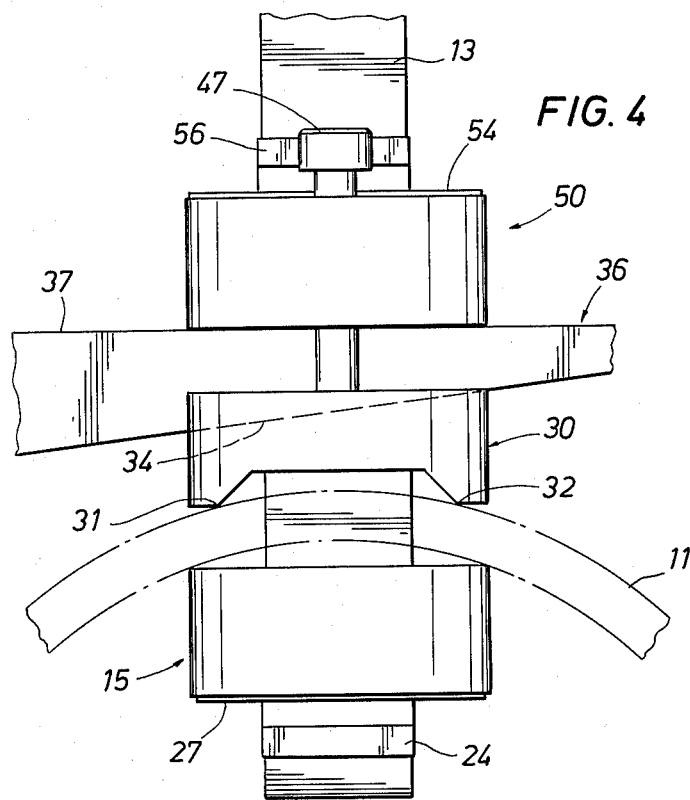
FIG. 4 is a side view of the apparatus as shown in FIG. 3 showing the alignment tool securing a curved plate for alignment.

On the top side of the plates 11 and 12, the alignment tool 10 of the present invention incorporates a bearing plate 30. The plate 30 incorporates a bottom face which is brought to a pair of points 31 and 32 (FIG. 1) which achieve line contact with the first and second plates 11 and 12. The points 31 and 32 face downwardly and are parallel to one another. They are space approximately equally from the strap 13. The strap 13 passes through a slot 33 in the center of the plate 30. The slot 33 is somewhat larger than the strap 13 shown in FIG. 3. The plate 30 is generally rectangular. The plate 30 has a generally uniform thickness which is illustrated in FIG. 3 except a central groove 34 is formed therein. The recess 34 is a shallow angled flat extending from edge to edge. The recess 34 is arranged at an angle with respect to the line of contact established by the edges 31 and 32 as more fully shown in FIG. 4 of the drawings. The recess 34 in the plate 30 is intended to receive in sliding transverse movement a tapered wedge 36. The wedge shown at 36 of FIG. 4 of the drawings slides in the groove. The wedge 36 tapers at an angle to match the angle of the groove 34 and thereby defines an upper face 37 on the wedge which, even though it moves laterally to and fro in FIG. 4 of the drawings, is maintained parallel to the lower face of the plate 30. The lower face of the plate 30 is defined by the edges 31 and 32 and adjacent steps of the alignment clamp with curved plate as depicted in FIG. 4 or straight plate. In both cases, the parallel faces enable the plate 30 and the wedge 36 to cooperatively define a means for increasing the tightness of the clamp when it is applied to the first and second plates 11 and 12 for purposes to be described.

Figure 2:
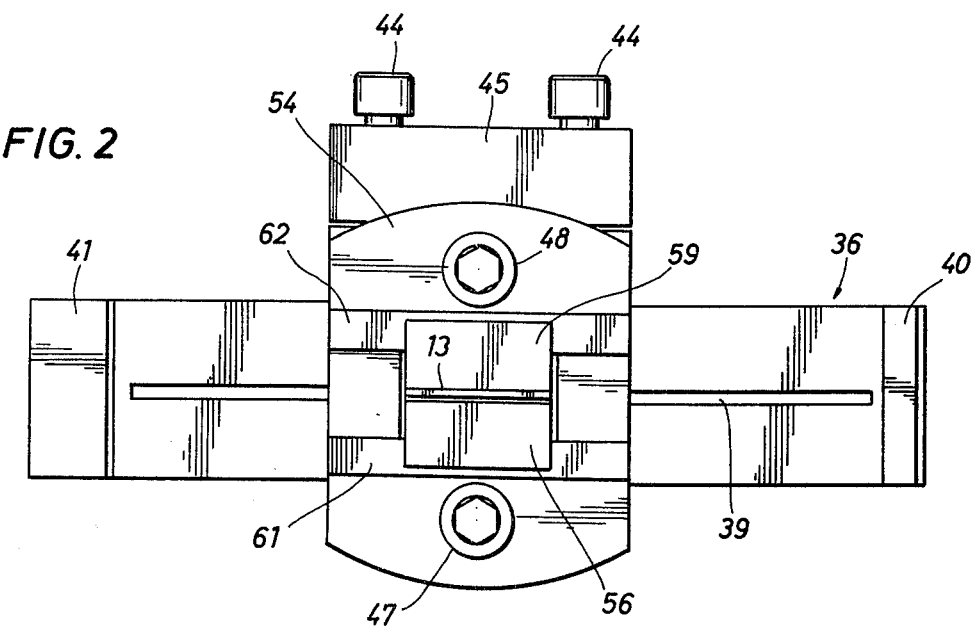
FIG. 2 is a plan view of the alignment tool showing a strap which extends vertically through the tool and passes through an elongated slot in a long tapered wedge.

In FIG. 2 of the drawings, the tapered wedge 36 includes a central lengthwise slot 39. This slot enables the strap 13 to pass through the wedge. As shown in FIG. 3, the slot 39 is undercut in FIG. 3 of the drawings. The slot 39 extends almost full length of the tapered wedge 36. The wedge is provided with an upturned lip at 40 the small end and a similar upturned tip 41 at the larger end (see FIG. 2) which prevent the wedge from sliding off the plate 30. As it travels to one extreme or the other of its movement the upturned lips 40 and 41 limit travel.

The plate 30 supports on a bolt 44 a U-shaped clamp 45 as shown in FIG. 3. It is appended to one side of the plate. The clamp 45 is permitted to rotate so that it brings its lower face against one of the plates 11 or 12. Its lower face contacts and aligns the plate 30.

The plate 30 is drilled and threaded to form a pair of openings at 45 and 46 which receive alignment bolts 47 and 48 as shown in FIG. 3. The parallel bolts 47 and 48 extend vertically above the plate 30.

In FIG. 3 of the drawings, the upstanding bolts 47 and 48 align a top clamp 50. The top clamp 50 is a plate like member which is held parallel to the plate 30 and spaced thereabove by the wedge 36. The top plate 50 is drilled at two locations to provide unthreaded holes therethrough to align the plate 50 on the bolts 47 and 48 which enable the plate to slide upwardly or downwardly on the bolts. The plate 50 incorporates a central rectangular opening 51 (FIG. 1) which is defined by opposing tapered faces 52 and 53 shown in FIG. 3. The top and bottom faces 54 and 55 are parallel to one another. The bottom face 55 contacts the top face 37 of the tapered wedge 36. The wedge slides laterally as viewed in FIGS. 2 and 4 of the drawings to thereby raise the top plate 55. The top plate 55 is raised to a level limited by contact with the heads on the bolts 47 and 48. They limit its upward movement.

The opening 51 tapers to a narrow neck at the bottom as shown in FIG. 3. The tapered opening 51 is wider at the top as shown in FIG. 3. This enables it to receive a serrated gripper 56 and a smooth faced gripper 57. The gripper 56 is an insert shaped to fit in the sloping opening 51. It has a tapered outer face which matches the face 52 of the opening. The opposite face is provided with serrations 58 which serrations contact the strap 13. The gripper 57 is provided with a tapered face matching the face 53 and a smooth face opposite thereof which contacts the strap 13 opposite the serrations 58. The two grippers together grip and hold the strap 13. The two grippers hold the strap and, by their wedge shape, are pulled snug against the stap. The gripper 56 is provided with a handle at the top end for hand removal. The gripper 57 stands taller and is provided with a handle 59 to enable it to be removed. To be removed, they need only be lifted upwardly to disengage the strap. It is not necessary to remove them from the rectangular opening 51 and to this end, transverse overlying locking shouldera 61 and 62 shown in FIG. 1 prevent excape of the grippers from the rectangular openings.

The apparatus functions in the following manner: The plates 11 and 12 are positioned near one another. The strap 13 is passed between them and is inserted between the grippers 23 and 24. The grippers 23 and 24 are wedged tightly in the rectangular opening 20. When they take a bite and clamp against the strap 13 the set screw is tightened. The strap 13 is pulled upwardly and passed through the lower plate 15 contacted with the first and second plates 11 and 12. This typically will occur on the inaccessable side of the plates. It might occur of the interior of a cylindrical pressure vessel by way of example. The strap 13 extends through the gap defined between the plates 11 and 12. This leaves the strap 13 exposed on the top face of the plate where easy acess is obtained for attachment of the remainder of the clamp apparatus.

With the strap 13 exposed, the plate 30 is dropped over the strap 13. The edges 31 and 32 contact the first and second plates. The strap 13 is then threaded through the wedge 36 at the narrow end of the wedge. The top plate 50 and the bolts 47 and 48 are then attached. The bolts are first passed through the top plate and then are threaded into the tapped openings. These are made fast. At this juncture, the top plate is some distance below the heads of the bolts in the manner illustrated in FIG. 3. It is easily slideable upwardly on the strap 13. The top grippers 56 and 57 are jammed into rectangular opening by hand pressure to grasp the strap. The grasp of the strap need only be slight at the beginning.

The wedge 36 is then forced into the space between the plates 30 and 50 by wedging action against the two. The top plate 50 moves freely upwardly until limited by the bolts 47 and 48. The wedge 36 is struck with a mallet to drive it deeper between the plates. The wedging action finds relief as the plates 30 and 50 are separated and the first and second plates 11 and 12 moves toward alignment to ease the strain. As this occurs, the loading of the clamp on the plates 11 and 12 brings them to perfect alignment. The strap 13 is then under substantial tension which applies the clamping force on both sides of the plates. This clamping action results in alignment of the two plates.

The welder can then start welding the plates 11 and 12 together. The interruption in the bead caused by the strap 13 is minimal. The welder thus begins putting the bead between the two to secure them together and as the bead extends toward the strap 13 which is thereafter removed. Its removal is quite easy expedited by using a mallet to strike the small end of the wedge to reduce the tension in the strap 13. After the wedge has been loosened, the bolts 47 and 48 are quickly unthreaded to enable the top plate 50 to be removed. It is disengaged from the strap 13 by removing one of the grippers from the locking position. The gripper 57 can be hand pulled upwardly a fraction of an inch to break its hold on the strap 13. This enables the plate 30 to be unthreaded from the strap and thereafter the wedge 36 is likewise removed. The strap then is permitted to fall through the slot between the plates 11 and 12. Once the plates 11 and 12 are partly welded, the welder thereafter can finish the weld by placing the bead in the shaped slot where the strap theretofore extended.

Figure 5:
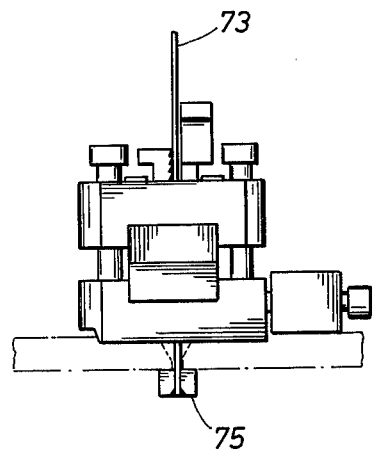
FIG. 5 is an alternative embodiment where the lower clamp member has been simplified.

The alignment clamp 10 of the present invention works equally well with flat plate or curved plate. The alignment clamp utilizes the wedging action of the wedge 36. Once the wedging action begins, it drives the top plate 30 downwardly against the plates 11 and 12. The wedge 36 preferably has a taper of more than 10° but typically less than 20° as illustrated in FIG. 4 of the drawings. The grippers which hold the strap are equipped with serrations which take a bite into the strap against the direction of pull. Thus, the pull increases, their grip increases. The tension in the strap 13 causes equal forces to be applied to the upper and lower surfaces of the plates 11 and 12. The forces align the plates by the constraint of the plates with the alignment clamp. In FIG. 5 of the drawings, the apparatus discloses a modified form of the strap 73. At the lower end of the strap, it is welded to an elongate rectangular bead 75. It has a width far exceeding the gap between the plates 11 and 12.

The foregoing is directed to the preferred embodiment of the present disclosure but the scope thereof is determined by the claims which follow.

It is claimed:

1. An alignment clamp for use in positioning first and second adjacent plates along a common parallel position and spaced from one another which apparatus comprises:
    an elongate strap having upper and lower ends and adapted to extend between a first and second plate to be positioned adjacent to one another;
    a generally planar plate means adapted to engage a surface of said first and second plates to be aligned and having an opening therethrough adapted to receive the lower end of said strap and which opening has a pair of tapered opposing sides with a wedge shaped strap gripping means therein;
    generally parallel upper and lower planar plates means having slots therethrough for receiving said strap and facing angled surfaces adjacent said slots; said angled surfaces being adapted to receive a wedged shaped body for separating said planar plates; the lower planar plate having a surface adapted for engaging the upper surface of the first and second plates to be aligned and the upper planar plate having a gripping means for securing said strap and fixedly positioning said upper planar plate with respect to said strap.

2. The apparatus of claim 1 wherein said wedge has a face tapered at an angle to match a tapered face on one of the two planar plates contacted thereby, said wedge further having a narrow and a wide end such that insertion of said wedge from the narrow end spreads said planar plates which move as constrained by said strap.

3. The apparatus of claim 2 wherein said wedge is provided with a lengthwise slot to straddle said strap.

4. The apparatus of claim 3 wherein said wedge includes end tabs protruding in such a manner as to limit lengthwise movement of said wedge from between said planar plates.

5. The apparatus of claim 3 wherein said planar plates have faces contacted against said wedge which maintains parallel positions relative to said first means to evenly load said strap across the width thereof, said strap having a relatively thin dimension perpendicular to the width thereof.

6. The apparatus of claim 1 wherein said upper planar plate grips said strap by a gripper means bearing on opposite faces of said strap and one of said gripper means having a serrated face in contact with said strap and the other of said gripper means having a cooperative smooth face in contact with said strap.

* * * * *